Aug. 12, 1924.

D. B. GARY 1,504,616

METHOD OF CUTTING BEVELED LUMBER

Filed Sept. 7, 1923.

Inventor
David B. Gary
By H.L.H.L. Reynolds.
Attorney

Patented Aug. 12, 1924.

1,504,616

UNITED STATES PATENT OFFICE.

DAVID B. GARY, OF EVERETT, WASHINGTON, ASSIGNOR OF ONE-HALF TO HARRY L. GARY, OF EVERETT, WASHINGTON.

METHOD OF CUTTING BEVELED LUMBER.

Application filed September 7, 1923. Serial No. 661,422.

*To all whom it may concern:*

Be it known that I, DAVID B. GARY, a citizen of the United States of America, and resident of the city of Everett, in the county of Snohomish and State of Washington, have invented certain new and useful Improvements in Methods of Cutting Beveled Lumber, of which the following is a specification.

My invention consists of a method of sawing logs and cants in the production of beveled edged lumber, whereby the log is made to produce a larger percentage of finished product than when it is sawed by the more customary methods.

The object of my invention is, therefore, not only to produce a better product, but a larger amount of it from the same material.

The accompanying drawings taken together with the following description, will clearly indicate the method which I employ.

The particular product for which my invention is employed is the production of beveled lumber, ordinarily referred to in the trade as clapboards. These, as well as what is ordinarily referred to as bevel siding, are thicker at one edge than at the other. Such lumber is used as a finish covering for houses. For such purposes it is very desirable that the lumber be vertical grain. As this product is a high class product, bringing a good price, the production of as large an amount as possible from a given log becomes a desirable object.

Figure 1:
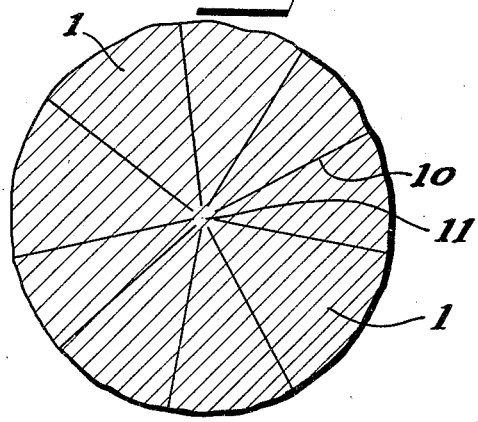
Figure 1 is a cross section of a log showing the first step in the process of cutting this up.

When the production of such lumber is from the log, the log is first cut into triangular segments, such as is indicated in Figure 1 by the lines 10. The manner in which this is done is largely immaterial. I prefer to do this by a mechanism which is adjusted so that it will saw a kerf in the log, which kerf is as truly radial as may conveniently be obtained and which stops just short of the center of the log, thereby leaving a small circular section 11 which binds the points of all of the segments 1 together. A log so sawn may be separated in its component segments by splitting them off at the center. This, if done from the large end, will not cause any material splintering or running into the body of the segments.

Figure 2:
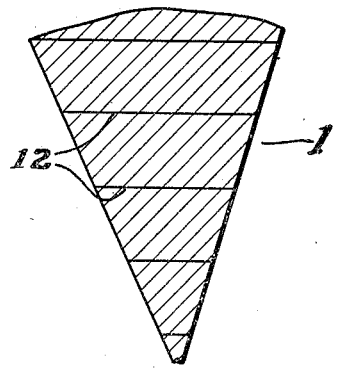
Figure 2 represents one of the segments of the log produced by sawing such as illustrated in Figure 1. It also illustrates the manner in which this segment is cut into cants for later sawing in accordance with the plan illustrated in Figure 3.
Figure 3:
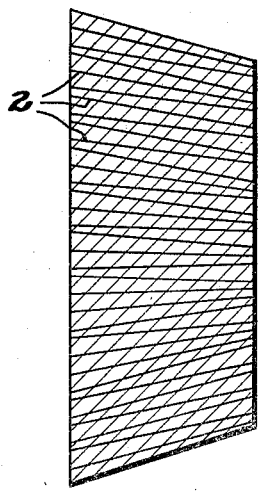
Figure 3 illustrates the method of final sawing of the cants to produce the beveled lumber.

With segments 1 as thus formed, the next step is to saw them into cants, as indicated by the lines 12 of Figure 2. These cants are then sawed after the manner indicated in Figure 3. To secure this result the relative angular position of the cants and the saw must be capable of adjustment so as to make the cut across the cant at whatever angle is desired within certain limits. In a cant such as shown in Figure 3, two of the opposite sides are parallel and the other two sides are tapering with relation to each other. The cuts made across such a cant are indicated by the transverse lines 2 of Figure 3. The first cut is so made that the thick edge of the clapboard lies at the broadest face of the cant. The next cut, if the taper of the side of the cant is sufficient to warrant it, is made in the same manner. However, the position of the thick edge of the boards sawed from the cant is reversed as soon as in the judgment of the operator this is desirable to maintain proper shape of the cant and to secure a true vertical condition for the grain of the board. This brings the thin edges of certain of the boards towards the broadest face of the cant. The number of boards so sawed will depend upon the size of the cant and the angle between the original tapered faces of the cant. This is a matter to be determined by the operator.

It is evident that by suitably distributing the position of the boards as cut from the cant, the entire body of the cant may be embodied in the boards cut, less, of course, the amount removed as saw dust. In the final step in the manufacture of the finished product, namely clapboards, the boards as received from the sawing machine are run through a sizing planer so that they are made absolutely true and uniform, both in thickness and in the width, so that when the ends of two boards are abutted in applying them to a building, there will be no ridge, but an absolutely smooth surface extending over the joint. Where this is secured the application of paint will eliminate the joint so far as its visibility extends.

By the method of sawing above indicated, the amount of lumber capable of being secured from a log of given size may be quite materially increased, thus making it possible to produce the lumber at a slightly lower cost, or for manufacturers to secure a somewhat larger profit.

What I claim as my invention is:

1. The method of cutting beveled lumber which consists in first cutting the log into triangular segments, cutting these segments into cants by cuts extending at right angles to the radius of the log which bisects such cut, then cutting the cants into vertical grain beveled lumber, alternating the position of the thick and thin edges of the lumber as required to use up the entire cant without waste.

2. The method of cutting beveled lumber which consists in first cutting the log into triangular segments, cutting these segments into cants by cuts extending at right angles to the radius of the log which bisects such cut, then cutting the cants into vertical grain beveled lumber, alternating the position of the thick and thin edges of the lumber as required to use up the entire cant without waste, and then passing the lumber through a sizing planer.

3. The method of forming beveled lumber which consists in first cutting cants having two opposite parallel sides and two opposite sides inclined toward each other, then cutting the beveled lumber with its edges at the parallel sides, disposing the thick and thin edges in alternation as needed to prevent waste.

Signed at Everett, Snohomish County, Washington, this 24th day of August, 1923.

DAVID B. GARY.